(12) United States Patent
Schmid et al.

(10) Patent No.: US 11,560,638 B2
(45) Date of Patent: Jan. 24, 2023

(54) ELECTROCHEMICAL METHOD OF AMMONIA GENERATION

(71) Applicant: Siemens Aktiengesellschaft, Munich (DE)

(72) Inventors: Günter Schmid, Hemhofen (DE); Timothy Hughes, Wantage (GB); Dan Taroata, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 87 days.

(21) Appl. No.: 16/320,669

(22) PCT Filed: Jul. 19, 2017

(86) PCT No.: PCT/EP2017/068233
§ 371 (c)(1),
(2) Date: Jan. 25, 2019

(87) PCT Pub. No.: WO2018/019677
PCT Pub. Date: Feb. 1, 2018

(65) Prior Publication Data
US 2019/0161876 A1 May 30, 2019

(30) Foreign Application Priority Data
Jul. 28, 2016 (GB) .................... 1613044

(51) Int. Cl.
*C25B 15/08* (2006.01)
*C25B 1/00* (2021.01)
(Continued)

(52) U.S. Cl.
CPC ............... *C25B 15/08* (2013.01); *C25B 1/00* (2013.01); *C25B 1/27* (2021.01); *C25B 9/00* (2013.01);
(Continued)

(58) Field of Classification Search
CPC .. C25B 1/00; C25B 1/27; C25B 15/08; C25B 9/00
See application file for complete search history.

(56) References Cited

U.S. PATENT DOCUMENTS

| | | | |
|---|---|---|---|
| 4,312,722 A | 1/1982 | Yoshida | 205/492 |
| 5,900,133 A | 5/1999 | Foller et al. | 205/551 |

(Continued)

FOREIGN PATENT DOCUMENTS

| | | | | |
|---|---|---|---|---|
| CN | 1495294 A | * | 5/2004 | C25B 1/245 |
| CN | 101479409 A | | 7/2009 | C25D 17/12 |

(Continued)

OTHER PUBLICATIONS

"Electrolytic Ammonia Synthesis from Hydrogen Chloride and Nitrogen Gases with Simultaneous Recovery of Chlorine under Atmospheric Pressure," Electrochemical and Solid-State Letters, 8 (8) D19-D21 (2005) (Year: 2005).*

(Continued)

*Primary Examiner* — Salil Jain
(74) *Attorney, Agent, or Firm* — Slayden Grubert Beard PLLC

(57) ABSTRACT

An electrolysis apparatus for producing ammonia, the apparatus comprising: a cathode; an anode; an electrolyte; a current source; a supply for nitrogen; and a supply for an acid, wherein the acid comprises at least one acid selected from the group consisting of: HCl, HBr, and HI.

15 Claims, 2 Drawing Sheets

(51) Int. Cl.
| | |
|---|---|
| *C25B 15/02* | (2021.01) |
| *C25B 9/00* | (2021.01) |
| *C25B 11/031* | (2021.01) |
| *C25B 11/051* | (2021.01) |
| *C25B 1/27* | (2021.01) |

(52) U.S. Cl.
CPC .......... *C25B 11/031* (2021.01); *C25B 11/051* (2021.01); *C25B 15/02* (2013.01); *Y02P 20/133* (2015.11)

(56) References Cited

U.S. PATENT DOCUMENTS

| | | | | |
|---|---|---|---|---|
| 2003/0164292 | A1* | 9/2003 | Denvir | C25B 1/00 204/252 |
| 2008/0149493 | A1* | 6/2008 | Friesen | C25B 1/00 205/337 |
| 2010/0025254 | A1 | 2/2010 | Kawaguchi et al. | 205/138 |
| 2010/0047155 | A1 | 2/2010 | Sauer et al. | 423/497 |
| 2011/0120880 | A1 | 5/2011 | Jiang et al. | 205/436 |
| 2016/0083853 | A1 | 3/2016 | Botte et al. | 205/338 |
| 2016/0138176 | A1* | 5/2016 | Yoo | C25B 1/00 204/239 |
| 2016/0264412 | A1 | 9/2016 | Neumann et al. | 252/373 |
| 2019/0382903 | A1* | 12/2019 | Johanning | C25B 9/18 |

FOREIGN PATENT DOCUMENTS

| | | | | |
|---|---|---|---|---|
| CN | 101600648 A | 12/2009 | ............... | C01B 7/03 |
| CN | 101914783 A | 12/2010 | ............... | C25B 1/02 |
| CN | 102560521 A | 7/2012 | ............... | C25B 1/00 |
| CN | 103154323 A | 6/2013 | ............... | C05C 9/00 |
| CN | 103866343 A | 6/2014 | ............... | C25B 1/00 |
| CN | 104630811 A | 5/2015 | ............... | C25B 1/00 |
| CN | 105793192 A | 7/2016 | ............... | C01B 31/40 |
| EP | 2413350 A1 * | 2/2012 | ....... | H01L 21/02505 |
| GB | 1405809 A | 9/1975 | ............... | C02F 1/467 |
| JP | 6046384 A | 3/1985 | ............... | C25B 1/26 |
| JP | 2012-026036 A | 2/2012 | ............... | C25B 1/00 |
| JP | 2014084478 A | 5/2014 | ............... | C25B 11/06 |
| KR | 2016-0064509 A | 6/2016 | ............... | C25B 1/00 |
| WO | 2009/012338 A1 | 1/2009 | ............... | C01B 32/50 |
| WO | 2018/019677 A1 | 2/2018 | ............... | C25B 1/00 |

OTHER PUBLICATIONS

Kim et al, "Electrochemical synthesis of ammonia from water and nitrogen catalyzed by nano-Fe2O3 and CoFe2O4 suspended in a molten LiCl-KCl-CsCl electrolyte," Korean J. Chem. Eng., 33(6), 1777-1780 (2016) (Year: 2016).*

Murakami, Tsuyoshi et al., "Electrolytic Ammonia Synthesis in Molten Salts Under Atmospheric Pressure Using Methane as Hydrogen Source," Electrochemical and Solid State Letters, vol. 8, No. 4, pp. D12-D14, Mar. 1, 2005.

Murakami, Tsuyoshi et al., "Investigation of Anotic Reaction of Electrolytic Ammonia Synthesis in Molten Salts Under Atmospheric Pressure," Journal of Electrochemical Society, vol. 152, No. 5, pp. D75-D78, Mar. 25, 2005.

Chunyang Hou, et al., "Development and Utilization of China's Offshore Marine Seawater Resources," Ocean Press. pp. 56-60 (Chinese language w/ English translation), 2012.

Haiyang, Zhongguo Jinhai et al., "Web of Science, Electro and Molten Salt And Ammonia," ISBN 978-7-5027-8076-0, 19 pages (Chinese language w/ English translation), 2012.

Liu, Huazhang, "Ammonia Synthesis Catalyst 100 Years: Practice, Enlightenment, and Challenge," Chinese Journal of Catalysis, vol. 35, No. 10, pp. 1619-1640, Oct. 20, 2014.

Chinese Office Action, Application No. 201780046275.0, 10 pages, dated Jun. 23, 2020.

Chinese Office Action, Application No. 201780046275.0, 16 pages, dated Mar. 4, 2021.

Tsuneto et al., "Lithium-mediated electrochemical reduction of high pressure N2 to NH3", Elsevier Sequoia, Journal of Electroanalytical Chemistry, vol. 367, Issues 1-2, pp. 183-188, Mar. 4, 1994.

Murakami et al., "Electrolytic Synthesis of Ammonia in Molten Salts under Atmospheric Pressure", Journal of the American Chemical Society, American Chemical Society, vol. 125, No. 2, pp. 334-335, Dec. 12, 2002.

Goto et al., "Electrolytic ammonia synthesis from water and nitrogen gas in molten salt under atmospheric pressure", Elsevier, Electrochimica Acta, vol. 50, Issue 27, pp. 5423-5426, Apr. 7, 2005.

Nishikrori et al., Electrolytic Ammonia Synthesis from Hydrogen Chloride and Nitrogen Gases with Simultaneous Recovery of Chlorine under Atmospheric Pressure, Electrochemical and Solid-State Letters, vol. 8, Issue 8, 2005, pp. D19-D21, Dec. 12, 2016.

International Search Report and Written Opinion, Application No. PCT/EP2017/068233, 11 pages, dated Nov. 2, 2017.

* cited by examiner

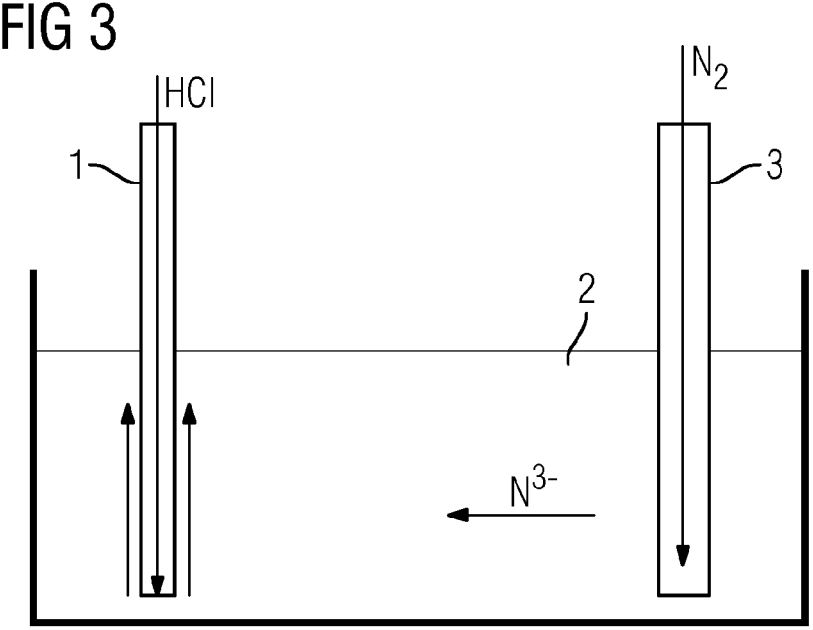

ELECTROCHEMICAL METHOD OF AMMONIA GENERATION

CROSS-REFERENCE TO RELATED APPLICATIONS

This application is a U.S. National Stage Application of International Application No. PCT/EP2017/068233 filed Jul. 19, 2017, which designates the United States of America, and claims priority to GB Application No. 1613044.5 filed Jul. 28, 2016, the contents of which are hereby incorporated by reference in their entirety.

TECHNICAL FIELD

The present disclosure relates to electrolysis. Various embodiments may include apparatus for producing ammonia and methods of electrolytically producing ammonia, wherein ammonia is purged from the electrolyte using HCl and/or HBr and/or HI.

BACKGROUND

The Haber-Bosch-Process was developed around 1910-1920 for the production of ammonia from air-nitrogen and hydrogen. Nowadays more than 130 Mt/y are produced. Hydrogen is obtained by using the energy from fossil sources. Electrochemical ways to produce hydrogen with wind or solar power could substitute fossil generated hydrogen in the Haber-Bosch process. However, the main disadvantages of the Haber-Bosch process, as part of a dynamic storage concept, arising from the high bond energy of the dinitrogen molecule are:
a. High temperatures (~450-550° C.)
b. High pressure (~250-350 bar)
c. Low conversion rate in a single pass (~20%)
d. Repeated decompression, re-heating One alternative to the Haber-Bosch process is the electrolytic production of ammonia using nitrogen and hydrogen, e.g. using gas diffusion electrodes. In such a setup nitrogen is provided at the cathode, whereas hydrogen is provided at the anode. At the cathode, nitride ions $N^{3-}$ are produced by the following reaction:

$$\tfrac{1}{2}N_2 + 3e^- \rightarrow N^{3-}$$

These nitride ions then migrate to the anode, where they react with hydrogen according to the following equation:

$$3/2 H_2 + N^{3-} \rightarrow NH_3 + 3e^-$$

The sum reaction is then as follows:

$$3/2 H_2 + \tfrac{1}{2} N_2 \rightarrow NH_3$$

Using e.g. molten salts as electrolyte at a temperature of 673 K, a Faradic efficiency η of about 72% can be reached. A main disadvantage of such a method is the double gas-diffusion electrode setup. At the anode the hydrogen may embrittle the metallic electrodes through hydride formation in the first step, which will later be split into an electron and a proton.

In the academic literature several methods were tried to implement the nitride sequence using different metals, described exemplary for Li, Mg, and Ca in Tables 1 and 2 below, and water into one single electrochemical cell as an alternative to produce ammonia.

TABLE 1

Nitride sequence, step 1

| Metal | Reaction | Nitrogen weight content in product |
|---|---|---|
| Li | $6\,Li + N_2 \rightarrow 2\,Li_3N$ | 40.20% |
| Mg | $3\,Mg + N_2 \rightarrow Mg_3N_2$ | 27.74% |
| Ca | $3\,Ca + N_2 \rightarrow Ca_3N_2$ | 18.89% |

TABLE 2

Nitride sequence, step 2

| Metal | Reaction | Reaction enthalpy |
|---|---|---|
| Li | $Li_3N + 3\,H_2O \rightarrow 3\,LiOH + NH_3$ | $-444\ kJ/mol$ |
| Mg | $Mg_3N_2 + 3\,H_2O \rightarrow 3\,MgO + 2\,NH_3$; $Mg(OH)_2$ decomposition temperature: 350° C. | $-708\ kJ/mol$ |
| Ca | $Ca_3N_2 + 3\,H_2O \rightarrow 3\,CaO + 2\,NH_3$; $Ca(OH)_2$ decomposition temperature: 550° C. | $-840\ kJ/mol$ |

The alkaline metals Li, Mg, Ca, as well as Sr, Ba that can be used as alternatives, can be produced by molten salt electrolysis. In the case of lithium, the electrolyte can consist of an eutectic mixture of LiCl/KCl. During electrolysis chlorine is formed on the anode, whereas lithium is formed on the cathode.

Nitride formation and migration can generally be mediated by the presence of metal ions in the electrolyte, e.g. lithium ions from LiCl. Metallic lithium, which would form on the cathode, reacts immediately with supplied nitrogen to form lithium nitride. The nitride is soluble in the electrolyte and moves to the anode. Normally—when using LiCl or similar solid electrolytes which are solid at ambient temperature and pressure, chlorine would be formed on the anode. In the case, when the anode is a hydrogen consumption electrode, the chlorine immediately reacts with hydrogen to form hydrogen chloride, which is the source of protons for the nitride ions. Eventually, ammonia is released. The reaction sequence can be summarized in the following equations.

Anode: $Cl^- \rightarrow \tfrac{1}{2} Cl_2 + e^-$ coupled to $3(\tfrac{1}{2}Cl_2 + \tfrac{1}{2}H_2 \rightarrow HCl)$ Cathode: $Li^+ + e^- \rightarrow Li$ coupled to $3Li + \tfrac{1}{2}N_2 \rightarrow Li_3N$ Summary: $Li_3N + 3HCl \rightarrow NH_3 + 3LiCl$ Several alternative routes exist in variations of the above reaction, as described e.g. in T. Murakami et al./Electrochimica Acta 50 (2005) 5423-5426. The LiCl/KCl electrolyte and the nitride ion production are the same as in the above process. Interestingly, the protons (not hydride) are supplied by injecting water vapor. Thus, the ammonia is produced at the cathode. Oxygen and not chlorine is formed at the cathode. If the anode is made from carbon, $CO_2$ will be formed.

In such processes, current efficiencies (Faradic efficiencies) up to 72% were observed in an academic setup. The electrolysis cell were purely experimental, thus no eye was kept on system efficiency by optimizing the electrolytic conditions. Current densities were also low around 5 mA/cm². However, normal commercial molten salt electrolyzers operate at current densities up to 600 mA/cm².

An alternative electrolyte used was lithium hydroxide. Temperatures above 400° C. are necessary to drive the process. However, the introduction of oxide species can destroy the electrolyte in the long term due to accumulation. Besides the molten salt electrolytes also $H^+$-conducting membranes were used. However, significant ammonia synthesis is only observed at temperatures above 500° C.

Lithium nitride seems to be an important intermediate to reduce nitrogen and eventually form $NH_3$ by protonation. Lithium nitride is also formed at room temperature. Tsuneto et. al., Journal of Electroanalytical Chemistry, 367 (1994) 183-188 described a low temperature, medium pressure synthesis of ammonia in a lithium-battery like environment with lithium triflate electrolyte in an ether type solvent.

SUMMARY

There remains a need for an efficient, low temperature, continuously operating electrolysis system for the generation of ammonia. Particularly, there is also a need for an electrolysis apparatus that can be reversibly operated so that losses of electrolyte and/or electrodes are minimized. The teachings of the present disclosure describe various concepts useful in this pursuit. For example, some embodiments include an electrolysis apparatus for producing ammonia, comprising: a cathode; an anode; an electrolyte; a current source; a supply for nitrogen; and a supply for HCl and/or HBr and/or HI.

In some embodiments, the anode comprises at least 10 wt. % of a metal selected from the group consisting of Li, Mg, Ca, Sr, Ba, Zn and Al, based on the total weight of the anode.

In some embodiments, there is a heater.

In some embodiments, there is a switch for reversing the polarity of the cathode and anode.

In some embodiments, the anode is a solid electrode or is a coated conductive sheet.

In some embodiments, the anode has a porous structure.

In some embodiments, the electrolyte has a melting point below the decomposition temperature of ammonia.

As another example, some embodiments includes a method of electrolytically producing ammonia, comprising: forming nitride ions from nitrogen at a cathode; forming metal ions from a metal at an anode comprising a metal; dissolving the nitride ions and metal ions in an electrolyte; and purging the electrolyte comprising the dissolved nitride ions and metal ions with HCl and/or HBr and/or HI.

In some embodiments, the metal is selected from the group consisting of Li, Mg, Ca, Sr, Ba, Zn and Al.

In some embodiments, the electrolyte is heated to a temperature below 500° C.

In some embodiments, the nitrogen is supplied through the cathode.

In some embodiments, the HCl and/or HBr and/or HI is supplied through the anode.

In some embodiments, the method includes switching the polarity of the anode and cathode after production of ammonia.

In some embodiments, the anode is regenerated after switching polarity of the anode and the cathode.

In some embodiments, the energy for the electrolysis and optionally regeneration of the anode is provided from renewable sources.

BRIEF DESCRIPTION OF THE DRAWINGS

Further aspects and embodiments of the teachings herein are discussed in the following description, figures and examples, without being limited thereto. The drawings illustrate embodiments of the present disclosure and convey a further understanding thereof. In connection with the description they serve as explanation of concepts and principles of the teachings. Other embodiments and many of the stated advantages can be derived in relation to the drawings. The elements of the drawings are not necessarily to scale towards each other and are schematic. Identical, functionally equivalent and acting equal features and components are denoted in the figures of the drawings with the same reference numbers, unless noted otherwise.

FIG. 3 shows schematically still another electrolysis apparatus for producing ammonia incorporating teachings of the present disclosure.

DETAILED DESCRIPTION

Figure 1:
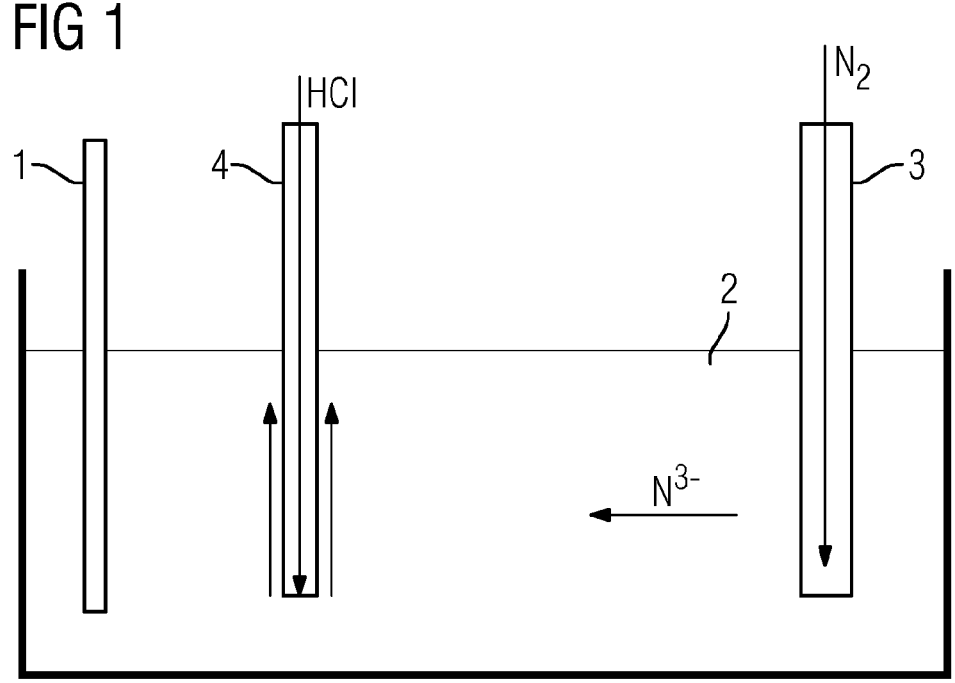
FIG. 1 shows schematically an electrolysis apparatus for producing ammonia incorporating teachings of the present disclosure.

The teachings herein may be embodied in a process for electrolytically producing ammonia wherein the nitride species formed in the electrolysis is purged with HCl and/or HBr and/or HI. In some embodiments, optimized conditions for forming the nitride inside an electrolyte provide an efficient purging with HCl and/or HBr and/or HI.

In some embodiments, an electrolysis apparatus for producing ammonia, comprises:
  a cathode;
  an anode;
  an electrolyte;
  a current source;
  a supply for nitrogen; and
  a supply for HCl and/or HBr and/or HI.

In some embodiments, a method of electrolytically producing ammonia, comprises:
  forming nitride ions from nitrogen at a cathode;
  forming metal ions from a metal at an anode comprising a metal;
  dissolving the nitride ions and metal ions in an electrolyte; and
  purging the electrolyte comprising the dissolved nitride ions and metal ions with HCl and/or HBr and/or HI.

In some embodiments, an electrolysis apparatus for producing ammonia, comprises:
  a cathode;
  an anode;
  an electrolyte;
  a current source;
  a supply for nitrogen; and
  a supply for HCl and/or HBr and/or HI.

In some embodiments, HCl, HBr and/or HI are not supplied at the same time, but it is not excluded that at different times HCl, HBr and/or HI are provided alternately, e.g. depending on the supply or price thereof. In some embodiments, there is a supply for HCl or HBr or HI. In some embodiments, the HCl, HBr and/or HI are supplied in gaseous form.

In some embodiments, the cathode, the anode, and the current source are not particularly limited and can comprise those that are usually used in electrolysis. In some embodiments, an electrolysis apparatus enables an electrochemically process sequence to produce ammonia.

The overall reaction will be—with HCl as example for the hydrogen halides:

$$N_2 + 6HCl \rightarrow 2NH_3 + 3Cl_2$$

The chemical reaction can be summarized with regard to the cathode and anode in the following:

Cathode

In some embodiments, the cathode may comprise a metal and/or comprise a metal that can catalyse the formation of nitride ions from nitrogen, like iron, stainless steel, carbon. For example, an efficient ammonia developing cathode can be made from iron or at least comprising iron, very comparable to the catalyst in the Haber-Bosch-Process (Faraday efficiency (FE) 59% at 50 bar).

The following reaction takes place at the cathode:

$$\tfrac{1}{2}N_2 + 3e^- \rightarrow N^{3-}$$

The nitride formed will diffuse into the electrolyte and will be dissolved therein. Therefore, at least one nitride forming/stabilization cation should be present in the electrolyte. In some embodiments, Li, Mg, Ca and/or Mg ions are present in the electrolyte. In some embodiments, the cathode has a porous structure through which nitrogen can be supplied and/or which can enhance current density.

Anode

In some embodiments, the anode may deliver a nitride stabilizing cation. In principle, any cation could be used, as long as it can be dissolved in the electrolyte and may form a nitride salt. In some embodiments, nitride stabilizing cations are used to ensure purity of the electrolyte. Thus, the anode may comprise a metal selected from the group consisting of Li, Mg, Ca, Sr, Ba, Zn and Al, mixtures, and/or alloys thereof. Nitrides of these metals are stable at temperatures above 500° C. and are not easily hydrolysable.

The reaction at the anode is then as follows:

$$M \rightarrow M^{n+} + n\ e^-\ n=1(Li), 2(Mg,Ca,Sr,Ba,Zn), 3(Al)$$

In some embodiments, the metallic anodes contain at least 10 wt. % of a nitride forming metal to produce sufficient cations for forming nitride compounds in the electrolyte. In some embodiments, the anode comprises thus at least 10 wt. %, at least 20 wt. %, at least 50 wt. %, at least 80 wt. %, at least 90 wt. %, at least 95 wt. %, or even at least 99 wt. % of a metal selected from the group consisting of Li, Mg, Ca, Sr, Ba, Zn and Al, and/or mixtures and/or alloys thereof, based on the total weight of the anode. In some embodiments, the anode consists of a metal selected from the group consisting of Li, Mg, Ca, Sr, Ba, Zn, and Al, and/or mixtures and/or alloys thereof.

Usually, the thermal stability of ammonia is limited to around 500° C., particularly at most around 800° C., e.g. around 630° C. In some embodiments, the melting point of the metal and/or mixture and/or alloy thereof, forming the anode, is higher than 500° C., equal to or higher than 550° C., equal to or higher than 600° C., particularly higher than 630° C., e.g. equal to or higher than 650° C., so that solid anodes can be used even at higher ammonia synthesis temperatures which can favor ammonia equilibrium generation. In some embodiments, the melting point of the anode material may be higher with respect to the molten electrolyte.

This can be achieved for the following exemplary metals:

| | |
|---|---|
| Magnesium | 650° C. |
| Calcium | 842° C. |
| Strontium | 777° C. |
| Barium | 727° C. |
| Aluminum | 660° C. |

Also mixtures or alloys thereof can be used, as well, if they have a sufficient melting point. The elements zinc (420° C.) and lithium (180° C.) have a melting point below this level. However, it is not excluded, that these elements are one component of an alloy.

In some embodiments, the anode thus comprises at least 10 wt. %, at least 20 wt. %, at least 50 wt. %, at least 80 wt. %, at least 90 wt. %, at least 95 wt. %, or even at least 99 wt. % of a metal selected from the group consisting of Mg, Ca, Sr, Ba and Al, and/or mixtures and/or alloys thereof, based on the total weight of the anode. In some embodiments, the anode consists of a metal selected from the group consisting of Mg, Ca, Sr, Ba and Al, and/or mixtures and/or alloys thereof.

In some embodiments, the metal of the anode, e.g. the nitride stabilizing metal, can be supplied in liquid form, similar to the amalgam process in the chloralkali process. In such case lithium or zinc or their low melting alloys can be used. Depending on the density of the electrolyte, this electrode will swim on top of the electrolyte container or will flow on the bottom of the container. In such a case the liquid anode will not stay in one place and can be e.g. settle in a cavity, etc., but also at the bottom of the electrolysis apparatus. The cathode can then be arranged accordingly. In the case of a liquid electrode it can e.g. stay on the bottom of the cell, then it is fully immersed. In some embodiments, it can float on the cell. In such a case the nitride may be provided on the opposite side and therefore also protected.

In some embodiments, the anode comprises at least 10 wt. %, at least 20 wt. %, at least 50 wt. %, at least 80 wt. %, at least 90 wt. %, at least 95 wt. %, or even at least 99 wt. % of a metal selected from the group consisting of Li and Zn, and/or mixtures and/or alloys thereof, based on the total weight of the anode. In some embodiments, the anode consists of a metal selected from the group consisting of Li and Zn, and/or mixtures and/or alloys thereof.

In some embodiments, the anode is a solid electrode or is a coated conductive sheet. In this way an easy regeneration thereof is possible. In some embodiments, the anode has a porous structure, which can enhance the current density supplied there through, e.g. at 200-1500 mA/cm². A porous structure can even allow gas purging through the structure according to certain embodiments. Such a gas-diffusion electrode type setup for the anode may comprise an HCl and/or HBr and/or HI inert material, such as stainless steel. In such a case, the mediator metal is then only coated on top of this carrier, i.e. on the outside surface of the anode in contact with the electrolyte.

In some embodiments, the material of the anode and the cathode, e.g. metal material, is fully immersed in the molten electrolyte so that the risk of ammonia decomposition can be decreased. In some embodiments, current is supplied to such fully immersed electrodes via leads that are covered with a material that does not react with ammonia and is not molten at the temperatures of the electrolysis, e.g. steel. In some embodiments, purging of the ammonia using HCl and/or HBr and/or HI is controlled in such a way that ammonia does not contact any metals at a temperature where ammonia is again decomposed. In some embodiments, the electrolysis takes place in an apparatus wherein the presence of oxygen gas is essentially avoided, e.g. by using inert gases like nitrogen and/or noble gases in the atmosphere above the electrolyte.

Further, also the electrolyte is not particularly limited and can comprise those used in an electrolytic production, e.g. of ammonia. In some embodiments, no water is contained in the electrolyte as it will react at the anode. In some embodiments, the electrolyte is a solid electrolyte electrolytes which is solid at ambient temperature and pressure, e.g. comprising or consisting of salts or mixtures thereof, in some cases in molten form. In some embodiments, the electrolyte has a melting point below the decomposition temperature of ammonia. For example, the standard electrolyte LiCl/KCl eutectic, i.e. an eutectic mixture of LiCl and KCl with a melting point of 353° C. can be used. However, also mixtures of LiCl and KCl with a content between e.g. about 30 and about 85 mol % LiCl are suitable.

Also other salt mixtures can be used, though, e.g. mixtures of KCl and $MgCl_2$ with a content of $MgCl_2$ between about 25 and about 80 mol %, or mixtures of $BaCl_2$ and LiCl with a LiCl content between about 60 and 100 mol %, or mixtures of $BaCl_2$ and $MgCl_2$ with $MgCl_2$ contents between about 35 and about 80 mol %. Also melts of single salts, e.g. LiCl, or ternary salt mixtures, etc. can be used, as long as the melting point thereof is below the decomposition point of ammonia. Also, other salts than chloride salts can be used, alone or in mixture with each other and/or chloride salts, e.g. bromide salts, particularly when using HBr for purging of ammonia, and/or iodide salts, particularly when using HI for purging of ammonia, but also other salts like fluoride salts. The salts for the electrolyte are not particularly limited as long as they do not react with HCl and/or HBr and/or HI and also not with ammonia.

In some embodiments, the electrolyte has a melting point below 630° C., below 600° C., below 550° C., of 500° C. or less, 450° C. or less, 420° C. or less, or even 400° C. or less.

In some embodiments, the supply for nitrogen and/or for HCl and/or HBr and/or HI is not particularly limited and can be done via pipes, e.g. also porous pipes or perforated pipes, perforated plates, etc. In some embodiments, the materials for the supply for nitrogen and HCl and/or HBr and/or HI are stable against any reaction with nitrogen and HCl and/or HBr and/or HI. While this is less problematic for the nitrogen supply, the supply for HCl and/or HBr and/or HI may therefore be made from a HCl and/or HBr and/or HI inert material such as stainless steel, nickel-based alloys, etc. Supply of nitrogen and/or HCl and/or HBr and/or HI can also take place via the electrodes, nitrogen through the cathode and/or HCl and/or HBr and/or HI through the anode. In some embodiments, the electrode(s) can be made from a porous material, e.g. be in the form of gas diffusion electrodes, at least partially. In some embodiments, nitrogen is supplied through the cathode. HCl and/or HBr and/or HI can be supplied through the anode or through a separate supply, e.g. pipe, etc. In some embodiments, the supply for HCl and/or HBr and/or HI is directed in such a way that the HCl and/or HBr and/or HI cannot reach the anode and/or cathode so that no interaction thereof with the cathode and/or anode material might occur.

In some embodiments, proton sources for the generation of ammonia are critical and have to be compatible with electrochemistry, bearing the danger of side reactions. Thus, the proton source for reaction with the nitride is selected from HCl and/or HBr and/or HI, in some cases in gaseous form and anhydrous.

Figure 2:
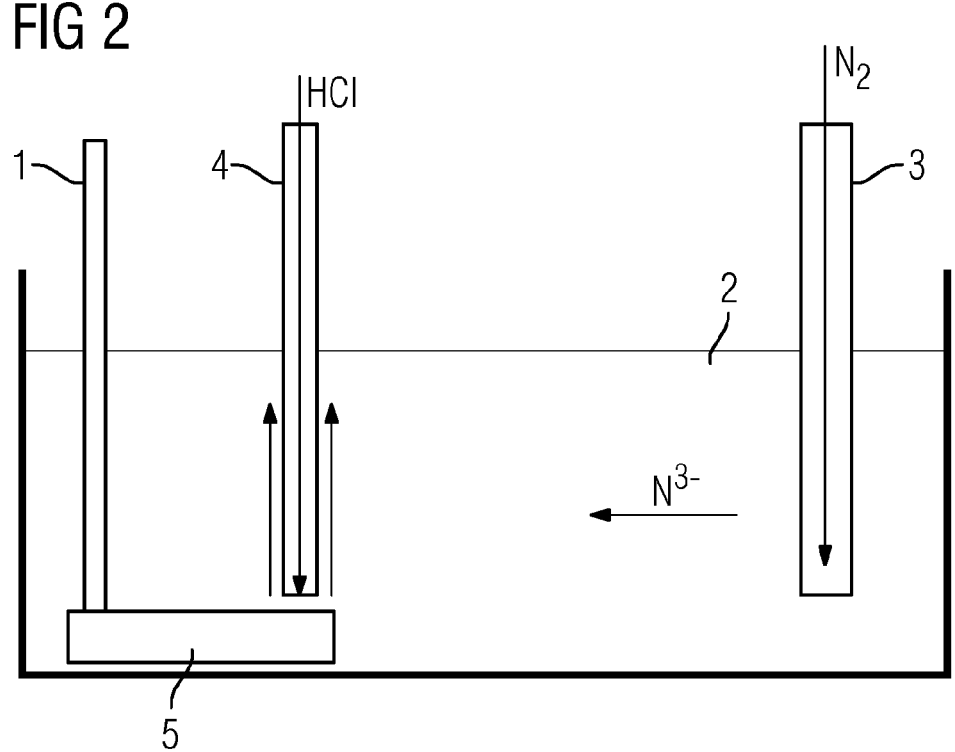
FIG. 2 shows schematically another electrolysis apparatus for producing ammonia incorporating teachings of the present disclosure.

Different possible set-ups for the present electrolysis apparatus are exemplified in FIGS. 1 to 3, with HCl gas as purging gas.

FIG. 1 shows a set-up in which the anode 1 and the cathode 3 are immersed inside a molten electrolyte 2. Nitrogen is supplied through the cathode 3 and reacts to form nitride ions $N^{3-}$ during electrolysis. These move towards the anode 1, which is partially dissolving during electrolysis, so that a nitride compound is formed in the solid electrolyte 2 which is solid at ambient temperature and pressure. This is then purged with HCl which is supplied through a HCl supply 4. While FIG. 1 is schematic, of course other electrode arrangements are possible, e.g. like in a Downs cell with circular electrode arrangement, and the electrode arrangement is not particularly limited.

FIG. 2 is comparable to the set-up in FIG. 1 and differs only in that the anode 1 is, at least partially, from a material that melts and forms a liquid anode 5, in this case at the bottom of the electrolysis apparatus. This liquid anode 5 can then provide cations for forming the nitride compound in the solid electrolyte 2 which is solid at ambient temperature and pressure. The set-up in FIG. 3 differs from the one in FIG. 1 in that no separate HCl supply is used, but HCl is supplied directly through anode 1, which can be formed as a porous anode, as exemplified above.

In some embodiments, the electrolysis apparatus further comprises a heater or more heaters, which can e.g. supply heat for melting a solid electrolyte. The heater is not particularly limited, and any suitable heater can be used, heating the electrolysis apparatus directly or indirectly. In some embodiments, heater heats at a temperature below 630° C., below 600° C., below 550° C., of 500° C. or less, 450° C. or less, 420° C. or less, or even 400° C. or less. In some embodiments, heating is carried out to a temperature of at least 200° C., 250° C., at least 275° C., at least 300° C., at least 355° C., or even at least 375° C. During electrolysis it can be possible, to switch off the heater, as the energy for electrolysis can be supplied from the electrolysis apparatus.

In some embodiments, the electrolysis apparatus further comprises a switch for reversing the polarity of the cathode and anode. This way it is possible to change the polarity of operation, and the anode can be regenerated after reversal of the polarity, as is also explained in more detail with regard to the present method. The metal of the anode, can be in-situ regenerated by reversing the polarity of the power supply. Changing electrodes can be carried out optionally.

In some embodiments, the present electrolysis apparatus further comprises other components, e.g. used in common electrolysis apparatuses. While according to certain embodiments no membranes are provided in the present electrolysis apparatus, it may also be possible to use membranes, e.g. a membrane that can conduct nitride ions near the cathode but protects the cathode from the HCl and/or HBr and/or HI. Similar thought can be made with regard to the anode.

In some embodiments, all processes can be electrochemically run. Stranded energy from renewable sources may be the primary energy source. In some embodiments, the electrolysis apparatus comprises at least one source for renewable energy.

In some embodiments, a method of electrolytically producing ammonia, comprises:
 forming nitride ions from nitrogen at a cathode;
 forming metal ions from a metal at an anode comprising a metal;
 dissolving the nitride ions and metal ions in an electrolyte; and purging the electrolyte comprising the dissolved nitride ions and metal ions with HCl and/or HBr and/or HI.

In some embodiments, purging is carried out with HCl or HBr or HI. However, during separate electrolysis procedures, e.g. after regeneration of an anode or exchange thereof and possibly regeneration or change of the electrolyte, it is possible to use different purging means, e.g. one time HCl and the next time HBr or HI, in some cases all in gaseous form. In some embodiments, the electrolyte comprising the dissolved nitride ions and metal ions is carried out with gaseous HCl and/or gaseous HBr and/or gaseous HI. While theoretically also HF could be used, which is not necessarily excluded, HCl and/or HBr and/or HI can be handled easier. In some embodiments, HCl and/or HBr and/or HI are supplied in such a way that ammonia can be efficiently purged, e.g. in such a stoichiometry, for example substoichiometrically, that no ammonium chloride is generated.

In some embodiments, a solid electrolyte which is solid at ambient temperature and pressure, e.g. comprising or consisting of salts or mixtures thereof, can be used, particularly in molten form. In some embodiments, a (e.g. molten salt) process sequence, where nitride forming metallic species can be used as anode materials, and is similar to existing setups for producing ammonia. The anode, however, does not necessarily have to be formed by a gas diffusion electrode.

During the process, a metal salt produced from the anode, like $MgCl_2$, accumulates in the electrolyte.

In some embodiments, the metal is selected from the group consisting of Li, Mg, Ca, Sr, Ba, Zn and Al. In some embodiments, the electrolyte is heated to a temperature below 630° C., below 600° C., below 550° C., to a temperature of 500° C. or less, to a temperature below 500° C., 450° C. or less, 420° C. or less, or even 400° C. or less. After an initial heating of the electrolyte for melting, it is possible that no further heating is necessary as the electrolysis will supply the energy needed, and it might be even necessary to cool the process to keep a suitable temperature.

In some embodiments, the nitrogen is supplied through the cathode, e.g. a porous cathode. According to certain embodiments, the HCl and/or HBr and/or HI is supplied through the anode, e.g. a porous anode.

In some embodiments, a method comprises a step of switching the polarity of the anode and cathode after production of ammonia. This way, the anode can be regenerated after switching polarity of the anode and the cathode. The metal of the anode, e.g. magnesium, can thus be regenerated by reversing the polarity of the power supply.

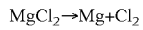
$MgCl_2 \rightarrow Mg + Cl_2$

In this case, the nitrogen reducing electrode will become a chlorine producing anode. In some embodiments, it could be more advantageous to pull out the nitrogen reducing cathode and substitute it by a chlorine oxidizing anode. The chlorine can be either sold or re-used in part according to stoichiometry to produce gaseous HCl. Analogue thoughts can be made when using alternatively or additionally HBr and/or HI.

In some embodiments, waste diluted HCl, HBr and/or HI can be used to produce gaseous HCl, HBr and/or HI. The waste diluted hydrogen halide can be e.g. electrolyzed, e.g. to $H_2$ and $Cl_2$ in case of HCl. Both products, now fully dry, can be burned to form gaseous anhydrous HCl (alternatively or in addition HBr or HI). This yields the following summarized equation for the overall process in the present method:

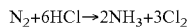
$N_2 + 6HCl \rightarrow 2NH_3 + 3Cl_2$

In some embodiments, the method includes replacing the anode used with a new one after generation of ammonia. In such a case also the electrolyte can be exchanged and the used electrolyte can be recycled for the regeneration of the anode material dissolved during electrolysis for ammonia generation.

In some embodiments, the energy for the electrolysis and optionally regeneration of the anode is provided from renewable sources, which are not particularly limited. This way renewable energy can be used to provide useful products, particularly ammonia, but possibly also chlorine. Ammonia can be used as fertilizer or for producing fertilizers, but also for producing further products like hydrazine or organic products, etc.

The above embodiments and teachings may be reasonably combined with each other. Further embodiments and implementations of the invention also comprise not explicitly described combinations of features of the invention given before or in the following with regard to examples of the invention. Particularly, the skilled person will also add single aspects as improvements or add-ons to the respective basic embodiments of the invention.

EXAMPLES

The teachings of the present disclosure will now be described in detail with reference to several examples thereof. However, these examples are illustrative and do not limit the scope of the teachings herein.

Example 1

In the following the reactions are exemplary formulated for magnesium (n=2) as anode material. In analogous ways the reaction can be formulated for n=1 and n=3. In the electrolysis, magnesium ions are formed by partially dissolving the anode.

$Mg \rightarrow Mg^{2+} + 2e^-$

Nitride formation takes place at the cathode, as laid out above, wherein the cathode is e.g. made from iron in the form of a gas diffusion electrode through which nitrogen is supplied from a nitrogen supply. LiCl/KCl is used as an exemplary solid electrolyte which is solid at ambient temperature and pressure and is warmed to about 400° C. During the course of electrolysis, the nitride is enriched in the electrolyte and forms salts, e.g. $Mg_3N_2$ or $Li_3N$ (because lithium ions are present in the LiCl/KCl electrolyte).

Ammonia is then released from the nitride salts in the electrolyte by purging the electrolyte with gaseous HCl (or alternatively with gaseous HBr or HI). The ammonia in the Example is released due the high temperature of the electrolyte. If an excess of HCl is used, sublimed $NH_4Cl$ may be isolated at colder sites of the system. If the temperature is kept high enough, though, and the amount of HCl is controlled, mainly ammonia will form. An exemplary reaction is as follows:

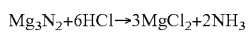
$Mg_3N_2 + 6HCl \rightarrow 3MgCl_2 + 2NH_3$

During the process $MgCl_2$ accumulates in the electrolyte. Magnesium can then be regenerated after ammonia production by reversing the polarity of the power supply, as exemplified by the following formula:

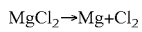
$MgCl_2 \rightarrow Mg + Cl_2$

In this case, the nitrogen reducing electrode will become a chlorine producing anode, and the chlorine can be further used in other reactions or for regeneration of gaseous HCl.

In some embodiments, a molten electrolyte process and setup produce ammonia from nitrogen and HCl and/or HBr and/or HI, which e.g. can be provided from diluted waste HCl and/or HBr and/or HI, via a nitride forming mediator such as Mg, Ca, Sr, Ba, Zn or Al. The net reaction therein is as follows:

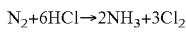

All processes can be electrochemically run. Stranded energy from renewable sources is therefore a possible energy source. The mediator can be in-situ regenerated by reversing the polarity of the power supply. Changing electrodes can be carried out optionally. The metal is only used as "mediator" in the system.

The overall process produces only high valuable compounds, such as $NH_3$ (around 500 €/t; 2016) or chlorine (around 390 €/t; 2016).

The present method can be carried out at a comparatively low temperature compared to the usual Haber-Bosch-synthesis of ammonia. Thus, the present low temperature reactions have the potential to produce ammonia at low temperatures.

What is claimed is:

1. An electrolysis apparatus for producing ammonia, the apparatus comprising:
    a cell;
    a cathode disposed in the cell;
    an anode disposed in the cell;
    an electrolyte within the cell, the electrolyte comprising dissolved metal ions;
    a current source connected to the cathode and the anode;
    a supply for providing nitrogen gas to the cell, the nitrogen converted into nitride ions at the cathode;
    wherein the nitride ions and the dissolved metal ions form a nitride compound in the electrolyte; and
    a supply for an acid to the cell, the acid purging the nitride compound from the electrolyte;
    wherein the acid comprises at least one acid selected from the group consisting of: HCl, HBr, and HI, and
    wherein the supply for the acid comprises at least one material selected from the group consisting of: stainless steel and nickel-based alloys;
    wherein the anode comprises a metal selected from the group consisting of: Li, Mg, Ca, Sr, Ba, Zn, and Al.

2. The electrolysis apparatus according to claim 1, wherein the anode comprises at least 10 wt. % of a metal selected from the group consisting of: Li, Mg, Ca, Sr, Ba, Zn, and Al, based on the total weight of the anode.

3. The electrolysis apparatus according to claim 1, further comprising a heater.

4. The electrolysis apparatus according to claim 1, further comprising a switch for reversing the polarity of the cathode and anode.

5. The electrolysis apparatus according to claim 1, wherein the anode comprises a solid electrode or a coated conductive sheet.

6. The electrolysis apparatus according to claim 1, wherein the anode comprises a porous structure.

7. The electrolysis apparatus according to claim 1, wherein the electrolyte has a melting point below the decomposition temperature of ammonia.

8. A method of electrolytically producing ammonia, the method comprising:
    forming nitride ions by converting nitrogen gat a cathode;
    forming metal ions from a metal at an anode comprising the metal;
    combining the nitride ions and the metal ions to form a nitride compound in an electrolyte during electrolysis; and
    purging the nitride compound from the electrolyte with an acid, wherein the acid is selected from a group consisting of: HCl, HBr, and HI.

9. The method of claim 8, wherein the metal is selected from the group consisting of: Li, Mg, Ca, Sr, Ba, Zn, and Al.

10. The method of claim 8, further comprising heating the electrolyte to a temperature below 500° C.

11. The method of claim 8, further comprising supplying nitrogen through the cathode.

12. The method of claim 8, further comprising supplying the acid through the anode.

13. The method of any claim 8, further comprising switching the polarity of the anode and cathode after production of ammonia.

14. The method of claim 13, further comprising regenerating the anode after switching polarity of the anode and the cathode.

15. The method of claim 8, further comprising supplying the energy for the electrolysis from renewable sources.

* * * * *